United States Patent
Bowerman et al.

(10) Patent No.: US 10,565,090 B1
(45) Date of Patent: Feb. 18, 2020

(54) PROXY FOR DEBUGGING TRANSFORMED CODE

(71) Applicant: Amazon Technologies, Inc., Seattle, WA (US)

(72) Inventors: Michael Bowerman, Seattle, WA (US); Ali Asghari, Seattle, WA (US); Vinay Chopra, Bellevue, WA (US); Alan Joseph, Seattle, WA (US); Andrey Zubkov, Snohomish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 114 days.

(21) Appl. No.: 15/861,429

(22) Filed: Jan. 3, 2018

(51) Int. Cl.
| | | |
|---|---|---|
| *G06F 11/36* | (2006.01) | |
| *G06F 9/44* | (2018.01) | |
| *G06F 9/46* | (2006.01) | |
| *G06F 9/455* | (2018.01) | |
| *H04L 9/32* | (2006.01) | |
| *G06F 8/51* | (2018.01) | |
| *H04L 29/08* | (2006.01) | |
| *H04L 29/06* | (2006.01) | |

(52) U.S. Cl.
CPC ............ *G06F 11/3624* (2013.01); *G06F 8/51* (2013.01); *H04L 9/3263* (2013.01); *H04L 63/168* (2013.01); *H04L 67/02* (2013.01); *H04L 67/28* (2013.01); *H04L 2209/76* (2013.01)

(58) Field of Classification Search
CPC ............ G06F 11/3636; G06F 11/3644; G06F 11/3664; G06F 11/3624; G06F 11/3648; G06F 8/51; G06F 8/41; G06F 11/362; G06F 11/3612; G06F 8/34; H04L 63/123; H04L 63/168
See application file for complete search history.

(56) References Cited

U.S. PATENT DOCUMENTS

| | | | |
|---|---|---|---|
| 6,751,735 B1 | 6/2004 | Schell et al. | |
| 7,814,472 B2 | 10/2010 | Atsatt | |
| 8,443,043 B2 | 5/2013 | Ogawa | |
| 8,949,660 B1 * | 2/2015 | Pupius | G06F 11/36 714/4.4 |
| 8,954,732 B1 | 2/2015 | Watsen et al. | |
| 9,031,531 B2 | 5/2015 | Miluzzo et al. | |
| 9,064,099 B2 * | 6/2015 | Horning | G06F 21/14 |
| 9,110,765 B2 * | 8/2015 | Bolotnikoff | G06F 16/84 |
| 9,147,086 B1 | 9/2015 | Potlapally et al. | |
| 9,189,515 B1 | 11/2015 | Tamilmani et al. | |
| 9,471,466 B1 * | 10/2016 | Garcia | G06F 11/3664 |

(Continued)

OTHER PUBLICATIONS

Lopes et al., DéjàVu: a map of code duplicates on GitHub, 28 pages (Year: 2017).*

(Continued)

*Primary Examiner* — Thuy Dao
(74) *Attorney, Agent, or Firm* — Thomas | Horstemeyer, LLP

(57) ABSTRACT

Disclosed are various embodiments for a proxy that enables debugging of transformed code. A proxy receives a request from a client application to obtain transformed code from a first server. The proxy obtains the transformed code from the first server, and the proxy obtains a source map corresponding to the transformed code from a second server. The proxy then returns the transformed code and the source map to the client application.

20 Claims, 7 Drawing Sheets

(56) References Cited

U.S. PATENT DOCUMENTS

| | | | |
|---|---|---|---|
| 9,594,512 B1 | 3/2017 | Cao et al. | |
| 9,729,524 B1 | 8/2017 | Brandwine et al. | |
| 9,886,448 B2 | 2/2018 | Kinkade et al. | |
| 10,078,574 B2* | 9/2018 | Lopian | G06F 11/3668 |
| 10,275,600 B2* | 4/2019 | Wysopal | G06F 11/3612 |
| 10,289,630 B2* | 5/2019 | Catania | G06F 8/70 |
| 2003/0122871 A1* | 7/2003 | Darlet | G06F 9/44521 |
| | | | 715/762 |
| 2004/0236943 A1 | 11/2004 | Edwards et al. | |
| 2005/0183072 A1* | 8/2005 | Horning | G06F 21/14 |
| | | | 717/140 |
| 2006/0129817 A1 | 6/2006 | Borneman et al. | |
| 2007/0022420 A1 | 1/2007 | Yamamoto et al. | |
| 2008/0005114 A1 | 1/2008 | Li | |
| 2008/0133929 A1 | 6/2008 | Gehrmann et al. | |
| 2010/0017506 A1 | 1/2010 | Fadell | |
| 2010/0031036 A1 | 2/2010 | Chauncey et al. | |
| 2012/0303963 A1 | 11/2012 | Murao et al. | |
| 2012/0311546 A1* | 12/2012 | Fanning | G06F 8/49 |
| | | | 717/136 |
| 2014/0040616 A1 | 2/2014 | Barber et al. | |
| 2014/0143647 A1 | 5/2014 | Reshadi et al. | |
| 2015/0033207 A1* | 1/2015 | Fung | G06F 8/34 |
| | | | 717/124 |
| 2015/0199261 A1* | 7/2015 | Paveza | G06F 11/3664 |
| | | | 717/124 |
| 2015/0309813 A1* | 10/2015 | Patel | G06F 8/75 |
| | | | 703/22 |
| 2015/0312044 A1 | 10/2015 | Tonegawa | |
| 2015/0317167 A1 | 11/2015 | Zhou et al. | |
| 2016/0192188 A1 | 6/2016 | Coulier | |
| 2017/0075686 A1 | 3/2017 | Ko | |
| 2018/0005153 A1* | 1/2018 | Ferguson, IV | G06Q 10/06311 |
| 2018/0032420 A1* | 2/2018 | Wadsworth | G06F 11/362 |

OTHER PUBLICATIONS

Cheng et al., Toward arbitrary mapping for debugging visualizations, 4 pages (Year: 2016).*
U.S. Appl. No. 15/472,823, filed Mar. 29, 2017, Final Office Action dated Apr. 4, 2019.
U.S. Appl. No. 15/472,823, filed Mar. 29, 2017, Non-Final Office Action dated Sep. 5, 2018.
U.S. Appl. No. 15/472,823, filed Mar. 27, 2017, Non-Final Office Action dated Sep. 6, 2019.

* cited by examiner

PROXY FOR DEBUGGING TRANSFORMED CODE

BACKGROUND

Interpreted computer code like JavaScript may undergo various transformations before it is released for production use. For example, the code may undergo a minification process in order to reduce its size. This may involve replacing long strings in method or variable names with much smaller strings, such as single character strings. In some cases, the code may undergo an obfuscation process that intentionally changes or randomizes the strings in order to obscure their meanings. However, debugging code that has been minified or obfuscated can be difficult.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a proxy application that enables debugging of code that has been transformed. Source code that is written by developer may be transformed in some respect before being released for production use. For example, code may be minified to reduce its size, obfuscated to make it unreadable, transpiled to be compatible with other programming language versions or platforms, compiled and stripped of character strings or symbols, and so on. Once these transformations are applied, debugging of the code becomes much more difficult, as transformed source code no longer corresponds to what was written by the developer. Stack traces, which show a sequence of functions that were invoked, may be meaningless to the developer as the function names may be replaced by random characters.

Source maps may be used in order to debug transformed code. A source map is generated as part of the transformation process, and includes a mapping to transform the code back to its pre-transformation state. For example, if a function named "getCustomerIdentifier" is transformed to "x7," the source map would record a mapping of "x7" to "getCustomerIdentifier." A debugging tool may employ the source map to allow for debugging of the transformed code, for example, to generate a transformation of a stack trace that is readable by the developer.

In practice, however, it can be difficult for a developer to locate a particular source map that pertains to a particular version of transformed code. Each time an incremental production version is transformed and released, a new source map may be generated. The source map for one transformed version may be different and incompatible with the source map for another transformed version.

Various embodiments of the present disclosure introduce a proxy-based system for automated retrieval of debugging information, such as source maps. This advantageously avoids creation and management of separate code bundles for developers and production users. Further, this automated procedure avoids problems in matching source maps with specific versions of transformed code. In addition, access controls can be implemented that maintain security of the source maps such that they are not inadvertently leaked out to a public network.

Upon intercepting a request for transformed code, the proxy obtains both the transformed code and corresponding debugging information that enables reversal of the transformation. The proxy returns the transformed code and debugging information to the requestor. In some cases, the proxy may resign the code with a digital certificate that is trusted by the requestor. Subsequently, the requestor, which may be a debugging tool of a web browser or another debugging tool, can facilitate analysis of stack traces or other features of the originally developed code by reversing the transformation.

Figure 1:
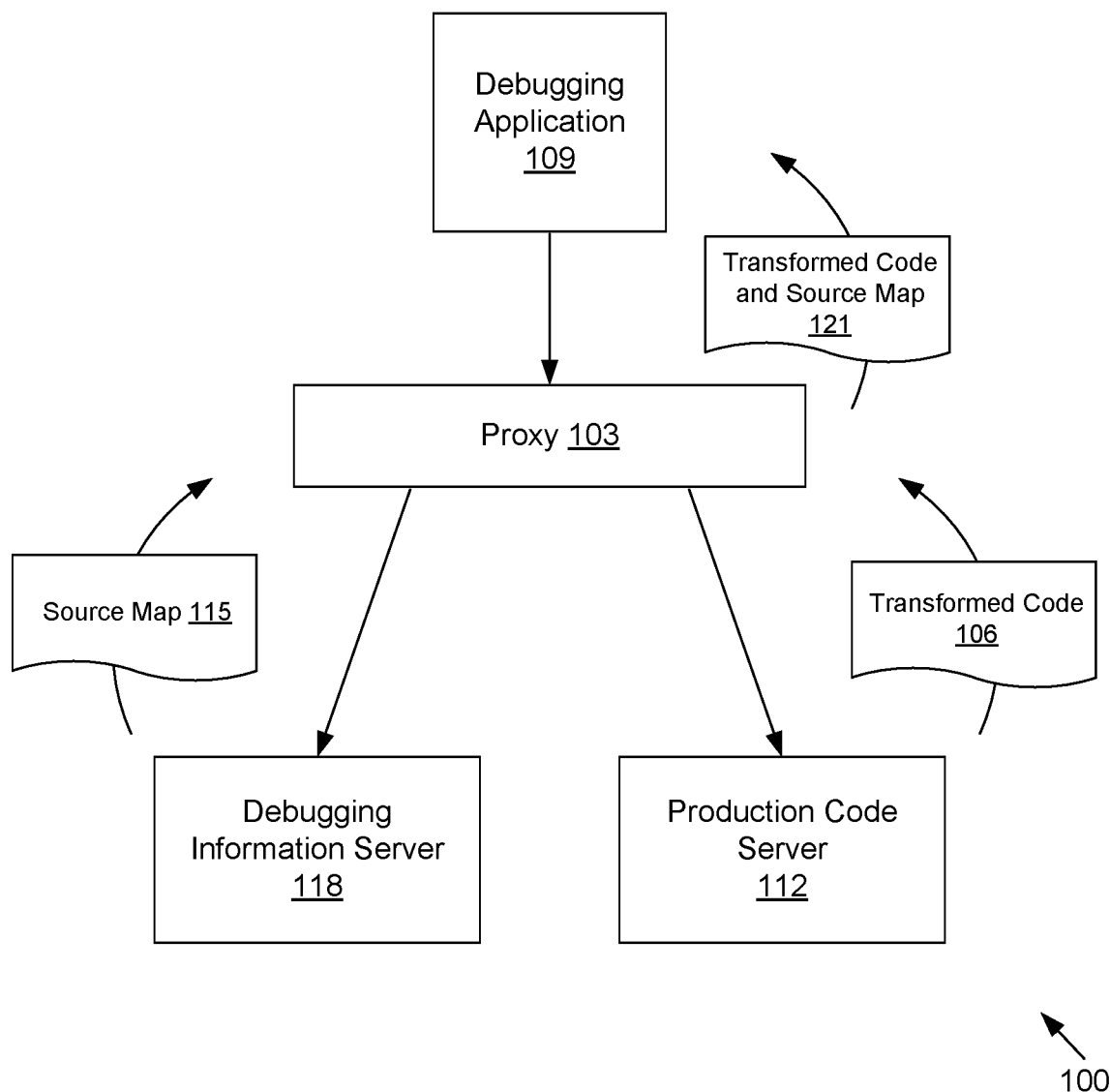
FIG. 1 is a drawing of an example scenario involving the use of a proxy to debug transformed code according to various embodiments of the present disclosure.

Turning now to FIG. 1, shown is an example scenario 100 involving the use of a proxy 103 to debug transformed code 106. A developer using a debugging application 109 causes the debugging application 109 to request the transformed code 106 from a production code server 112. The request is routed through a proxy 103, which requests the transformed code 106 from the production code server 112 and also requests a source map 115 from a debugging information server 118. The proxy 103 then returns the transformed code and source map 121 to the debugging application 109. In the following discussion, a general description of the system and its components is provided, followed by a discussion of the operation of the same.

Figure 2:
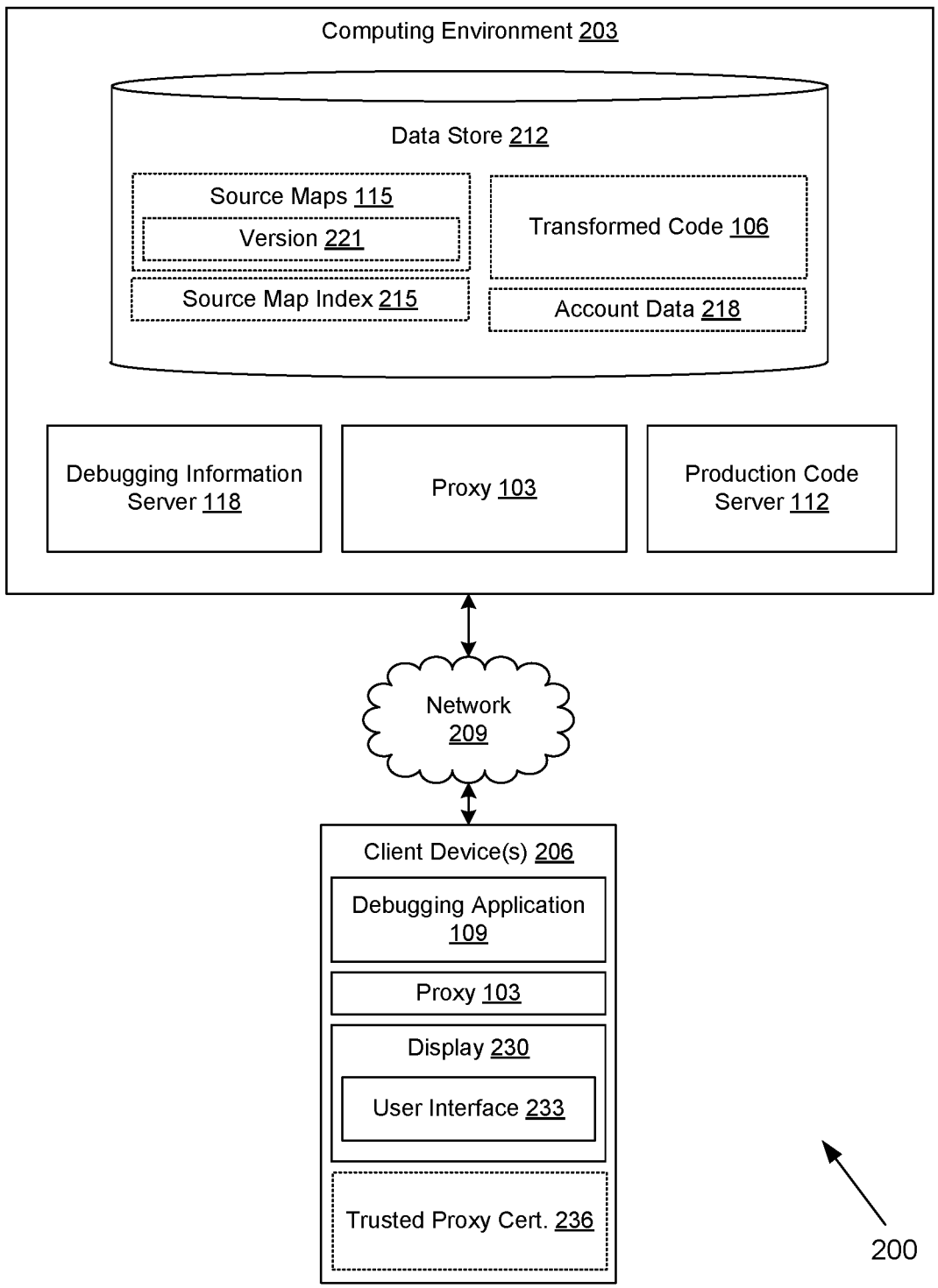
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a production code server 112, a debugging information server 118, a proxy 103, and other applications, services, processes, systems, engines, or functionality not discussed in detail herein. The production code server 112 is executed to serve code in production use, such as the transformed code 106, and/or other forms of network content to client devices 206 via the network 209. In this regard, the production code server 112 may correspond to a hypertext transfer protocol (HTTP) server.

The debugging information server 118 is executed to index and store source maps 115 for developers when the source maps 115 are generated. Subsequently, the source maps 121 may be requested from the debugging information server 118 for analysis and debugging of the transformed code 106. The debugging information server 118 may correspond to an HTTP server and may include applications that generate user interfaces that enable receiving the source maps 115 from developer users.

The proxy 103 is executed to intercept requests by the debugging application 109 for transformed code 106 from the production code server 112 and to request both the transformed code 106 and the corresponding source map 115 from the production code server 112 and the debugging information server 118. The proxy 103 may then relay the transformed code 106 and the source map 115 to the debugging application 109. In one embodiment, the proxy 103 may alter the transformed code 106 to include a uniform resource locator (URL) of the source map 115. In altering the transformed code 106, a previous digital signature may be invalidated. As such, the proxy 103 may be configured to resign the altered transformed code 106 with a trusted certificate in order to satisfy security requirements associated with the debugging application 109. In some embodiments, the proxy 103 may be configured to automatically apply reverse the transformation of the transformed code 106 by applying the source map 115 before it is received by the debugging application 109.

The data stored in the data store 212 includes, for example, source maps 115, a source map index 215, transformed code 106, account data 218, and potentially other data. The transformed code 106 corresponds to any computer program code that has been transformed in some way that can negatively affect debugging. For example, the transformed code 106 may correspond to source code that has been minified, obfuscated, or transpiled. The transformed code 106 in this case may correspond to interpreted code such as JavaScript, Python, Ruby, and so forth. As another example, the transformed code 106 may correspond to object code or compiled code for which a symbol table or strings have been stripped from the code. The transformed code 106 in this case may correspond to Objective C code, iOS applications, and so on. The transformed code 106 may be compressed and/or otherwise formatted for transfer to users via the production code server 112 for production use of a web application or other application. As the transformed code 106 may be executed on client devices 206 out of control of the developers, the transformations may be applied to the transformed code 106 to prevent reverse engineering or otherwise maintain security of the corresponding source code.

The source maps 115 include data that enable the reversal of the transformations applied to generate the transformed code 106. This can include reversal of a minification process, reversal of an obfuscation process, reversal of a transpilation process, restoration of a symbol table, and so on. Each source map 115 may be uniquely associated with a version 221 of the corresponding transformed code 106. For example, the same underlying source code may be transformed in different ways, thereby producing different versions 221 of transformed code 106. Each of the different versions 221 is associated with a respective source map 115 in order to reverse the transformation(s) that have been applied.

The source map index 215 may facilitate identification of the source map 115 corresponding to a specific version 221 of the transformed code 106. In one implementation, each of the source maps 115 may be indexed in the source map index 215 by a hash value of the transformed code 106.

The account data 218 may include data associated with user accounts maintained for accessing the debugging information server 118. It is noted that while the transformed code 106 may have wide accessibility (e.g., across an organization or by the general public), the source maps 115 may have limited accessibility. It may be that only authenticated registered users will have access. The authentication may take place by the proxy 103, or may be performed by the debugging information server 118. In some cases, a hierarchy of access for different source maps 115 may be established. For example, source maps 115 for open source libraries may be generally accessible, while source maps 115 for specific files or portions of transformed code 106 may be limited access. Accessibility of the source maps 115 may depend upon whether the account data 218 indicates that a particular user is associated with a particular team, subteam, or department within an organization.

FIG. 2 depicts a single computing environment 203 hosting the debugging information server 118, the proxy 103, and the production code server 112. In other embodiments, the debugging information server 118, the proxy 103, and/or the production code server 112 may be hosted on different computing environments 203, and by different organizations or on different networks 209. In one embodiment, the system including the debugging information server 118 and the proxy 103 may be provided by a first organization as a service for a second organization that controls the production code server 112.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 230. The display 230 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a debugging application 109, a proxy 103, and/or other applications. The debugging application 109 may be executed in a client device 206, for example, to access and debug network content served up by the computing environment 203 and/or other servers, thereby rendering a user interface 233 on the display 230. To this end, the debugging application 109 may comprise, for example, a browser, a dedicated application, etc., and the user interface 233 may comprise a network page, an application screen, etc. The debugging application 109 is configured to facilitate inspection and debugging (e.g., viewing stack traces) of client-executable code, such as the transformed code 106. The debugging application 109 may include functionality to apply a source map 115 to reverse a transformation on the transformed code 106. Where the proxy 103 resigns the transformed code 106 using a secure certificate, the debugging application 109 may be configured to recognize the trusted proxy certificate 236 as being trusted.

The proxy 103 may function on the client device 206 similarly to the proxy 103 described on the computing environment 203. The placement of the proxy 103 on the client device 206 in FIG. 2 is to illustrate that in various embodiments, the proxy 103 may be located client-side or server-side. In various embodiments, the proxy 103 may be installed as a browser plug-in, browser extension, or browser-based application. The proxy 103 may function as a transparent proxy that is configured to transparently intercept the network traffic to or from the debugging application 109, or the debugging application 109 may be configured to route requests through the proxy 103.

Figure 3:
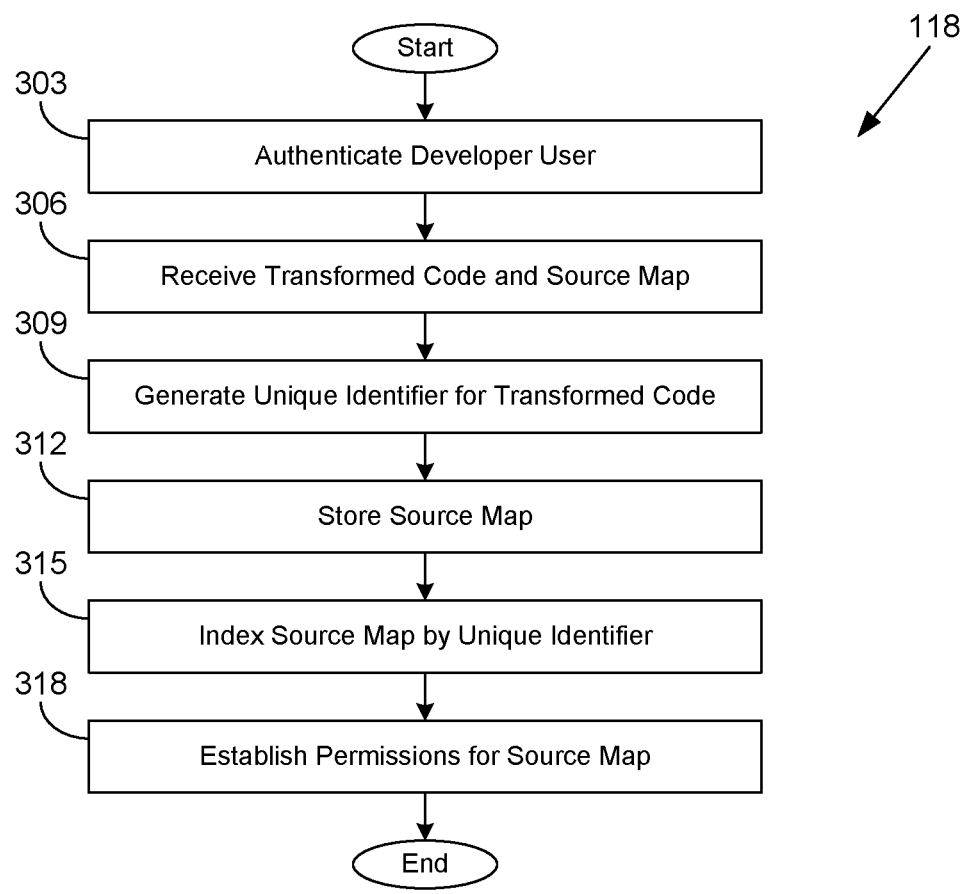
FIGS. 3 and 4 are flowcharts illustrating examples of functionality implemented as portions of a debugging information server executed in a computing environment in the networked environment of FIG. 2 according to various embodiments of the present disclosure.

Referring next to FIG. 3, shown is a flowchart that provides one example of the operation of a portion of the debugging information server 118 according to various embodiments. It is understood that the flowchart of FIG. 3 provides merely an example of the many different types of functional arrangements that may be employed to implement the operation of the portion of the debugging information server 118 as described herein. As an alternative, the flowchart of FIG. 3 may be viewed as depicting an example of elements of a method implemented in the computing environment 203 (FIG. 2) according to one or more embodiments.

Beginning with box 303, the debugging information server 118 authenticates a developer user at a client device 206. For example, the developer user may specify one or more security credentials, such as a username and a password, and the debugging information server 118 may verify that the username and the password are correct according to the account data 218. In box 306, the debugging information server 118 receives transformed code 106 (FIG. 2) and a source map 115 (FIG. 2) for the transformed code 106 from the client device 206 over the network 209 (FIG. 2). The client device 206 may upload the transformed code 106 and/or the source map 115, or the client device 206 may specify uniform resource locators (URLs) of the transformed code 106 and/or the source map 115 to the debugging information server 118.

In box 309, the debugging information server 118 generates a unique identifier for the transformed code 106. For instance, the debugging information server 118 may perform a hashing function on the transformed code 106, thereby computing a hash value, which may then correspond to the unique identifier. Alternatively, the debugging information server 118 may determine a unique identifier on the basis of version number specified by the developer user or otherwise in the transformed code 106.

In box 312, the debugging information server 118 stores the source map 115 in the data store 212 (FIG. 2), which may be in association with a version 221 (FIG. 2) of the transformed code 106. In box 315, the debugging information server 118 indexes the source map 115 by the unique identifier, thereby updating the source map index 215 (FIG. 2).

In box 318, the debugging information server 118 establishes permissions for accounts to access the source map 115. For example, the developer user may specific particular user accounts or groups of user accounts that should have access to retrieve the source map. Alternatively, the debugging information server 118 may assign default permissions to the source map 115. Thereafter, the operation of the portion of the debugging information server 118 ends.

Figure 4:
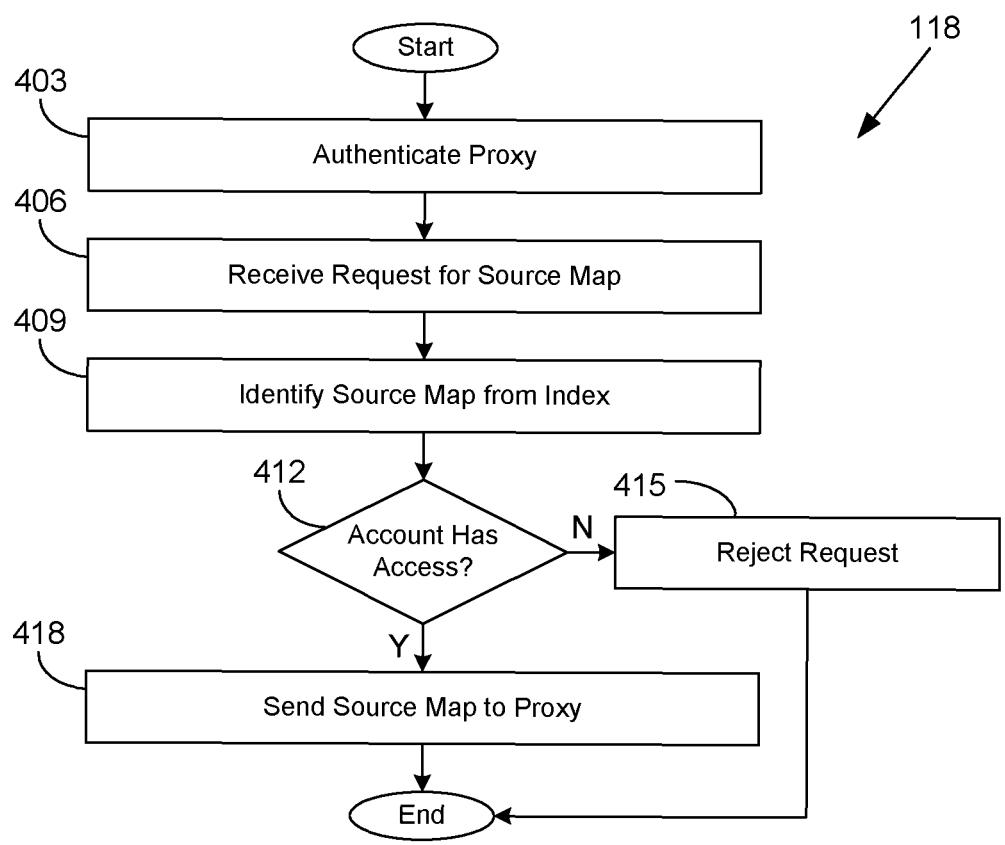

Turning now to FIG. 4, shown is a flowchart that provides one example of the operation of another portion of the debugging information server 118 according to various embodiments. It is understood that the flowchart of FIG. 4 provides merely an example of the many different types of functional arrangements that may be employed to implement the operation of the other portion of the debugging information server 118 as described herein. As an alternative, the flowchart of FIG. 4 may be viewed as depicting an example of elements of a method implemented in the computing environment 203 (FIG. 2) according to one or more embodiments.

Beginning with box 403, the debugging information server 118 authenticates a proxy 103 (FIG. 2) that presents one or more security credentials. In box 406, the debugging information server 118 receives a request from the proxy 103 for a source map 115 (FIG. 2). The request may include a unique identifier of the transformed code 106 (FIG. 2), which may be a version identifier of the transformed code 106. In box 409, the debugging information server 118 may identify the source map 115 from the source map index 215 (FIG. 2) using the unique identifier.

In box 412, the debugging information server 118 determines whether the account associated with the authenticated proxy 103 has access to the source map 115. If the account is determined not to have access, the debugging information server 118 proceeds to box 415 and rejects the request. Thereafter, the operation of the portion of the debugging information server 118 ends.

Otherwise, if the account is determined to have access, the debugging information server 118 moves from box 412 to box 418 and sends the source map 115 to the proxy 103 via the network 209 (FIG. 2). Thereafter, the operation of the portion of the debugging information server 118 ends.

Figure 5:
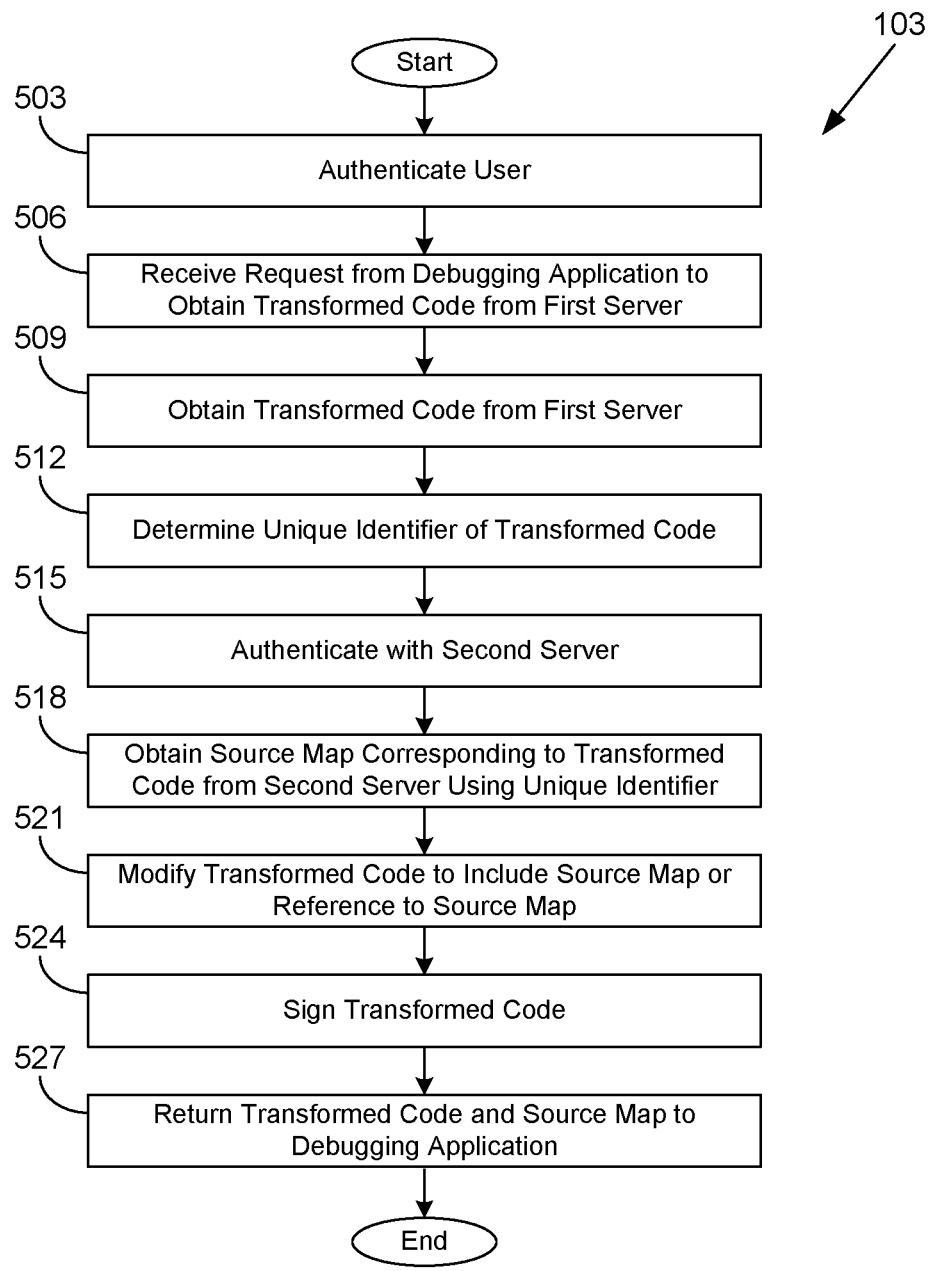
FIG. 5 is a flowchart illustrating one example of functionality implemented as portions of a proxy executed in a computing environment or a client device in the networked environment of FIG. 2 according to various embodiments of the present disclosure.

Moving on to FIG. 5, shown is a flowchart that provides one example of the operation of a portion of the proxy 103 according to various embodiments. It is understood that the flowchart of FIG. 5 provides merely an example of the many different types of functional arrangements that may be employed to implement the operation of the portion of the proxy 103 as described herein. As an alternative, the flowchart of FIG. 5 may be viewed as depicting an example of elements of a method implemented in the computing environment 203 (FIG. 2) or the client device 206 (FIG. 2) according to one or more embodiments.

Beginning with box 503, the proxy 103 authenticates a user associated with a debugging application 109 (FIG. 2). Alternatively, the proxy 103 may receive security credentials from a user or the debugging application 109, which may then in turn be passed to the debugging information server 118 (FIG. 2).

In box 506, the proxy 103 receives a request from the debugging application 109 to obtain transformed code 106 from a first server, such as the production code server 112 (FIG. 2). The request may be received by way of HTTP, HTTPS, or WebSocket. In some cases, the proxy 103 may transparently intercept the network traffic from the debugging application 118 as a transparent proxy. The request may comprise an HTTP GET request for the transformed code 106 at a certain URL (i.e., the production code server 112), and the proxy 103 may be configured to recognize that the resource being requested corresponds to transformed code 106.

In box 509, the proxy 103 obtains the transformed code 106 from the production code server 112. For example, the proxy 103 may issue an HTTP get request for the same URL specified by the debugging application 109. In box 512, the proxy 103 determines a unique identifier of the transformed code 106. In one embodiment, the proxy 103 may perform a hashing function on the transformed code 106 to generate a hash value corresponding to the unique identifier. Alternatively, the unique identifier may be specified in the transformed code 106 or determined by context (e.g., from the filename or URL of the transformed code 106).

In box 515, the proxy 103 authenticates with a second server, such as the debugging information server 118. The proxy 103 may use security credentials specified in box 503 to authenticate, or the proxy 103 may use a stored credential, such as a stored registration credential. In some cases, the proxy 103 may be authenticated based on network address.

In box 518, the proxy 103 obtains a source map 115 (FIG. 2) corresponding to the transformed code 106 from the second server using the unique identifier. This may be performed automatically in the sense that the debugging application 109 has not specifically requested the source map 115. For example, the proxy 103 may send an HTTP GET request to the second server that specifies the unique identifier within the URL. In box 521, the proxy 103 modifies the transformed code 106 to include the source map 115, or to include a reference to the source map 115 (e.g., a URL to the source map 115). In some cases, the proxy 103 may apply the source map 115 to the transformed code 106 directly in order to reverse a transformation.

In box 524, the proxy 103 signs the modified transformed code 106 using a trusted proxy certificate 236 (FIG. 2) that is trusted by the debugging application 109. In box 527, the proxy 103 returns the transformed code 106 and the source map 115 to the debugging application 109. Thereafter, the operation of the portion of the proxy 103 ends. It is noted that for use cases other than transformed code 106 having a source map 115, the proxy 103 may function as a conventional proxy that simply requests the content on behalf of the debugging application 109, obtains the content, and returns the content to the debugging application 109.

Figure 6:
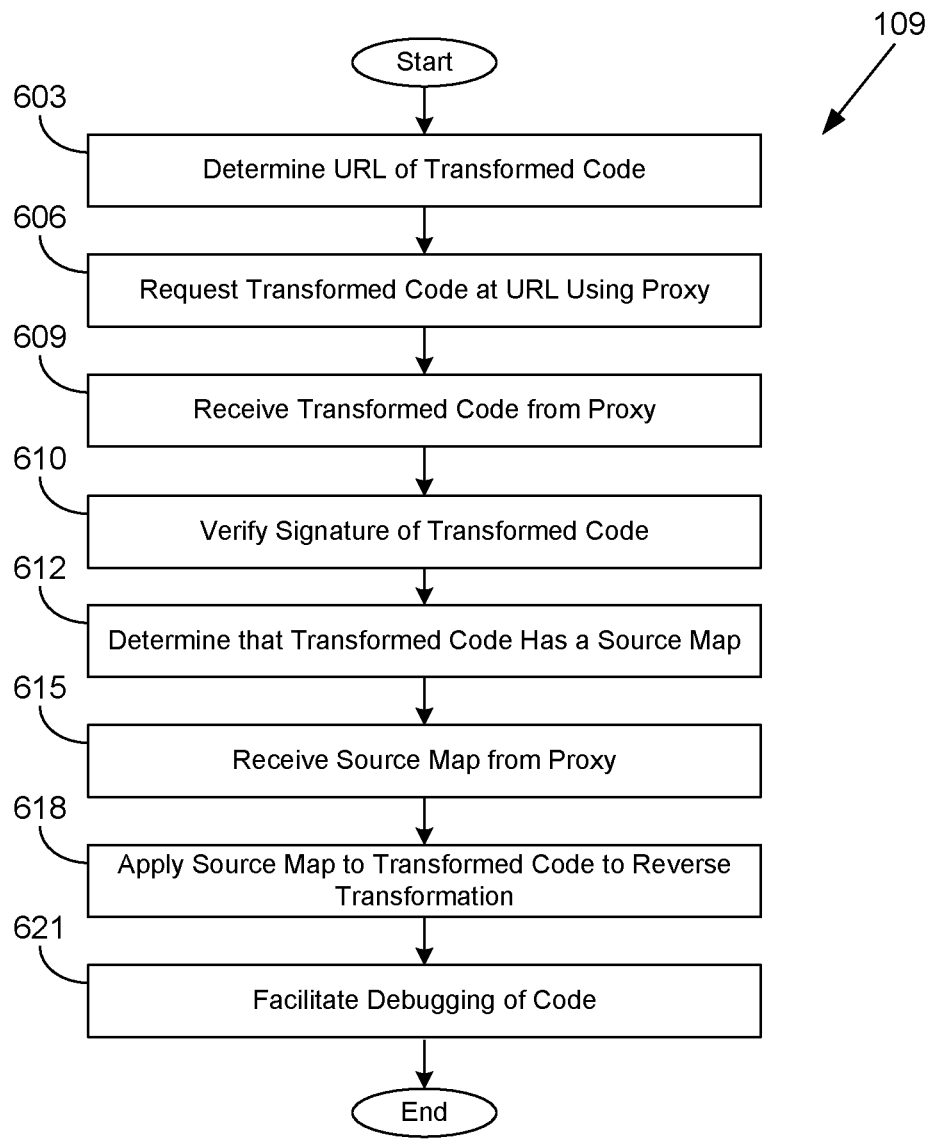
FIG. 6 is a flowchart illustrating one example of functionality implemented as portions of a debugging application executed in a client device in the networked environment of FIG. 2 according to various embodiments of the present disclosure.

Continuing now to FIG. 6, shown is a flowchart that provides one example of the operation of a portion of the debugging application 109 according to various embodiments. It is understood that the flowchart of FIG. 6 provides merely an example of the many different types of functional arrangements that may be employed to implement the operation of the portion of the debugging application 109 as described herein. As an alternative, the flowchart of FIG. 6 may be viewed as depicting an example of elements of a method implemented in the client device 206 (FIG. 2) according to one or more embodiments. In some cases, the debugging application 109 may be implemented similarly on a server, which is configured to render a user interface 233 (FIG. 2) on a client device 206.

Beginning with box 603, the debugging application 109 determines a URL of transformed code 106 (FIG. 2). For instance, a developer user may manually specify the URL via a user interface 233. Alternatively, the debugging application 109 may load one URL which includes a link to the URL of the transformed code 106. In such a case, the debugging application 109 may be configured to automatically request the transformed code 106 at the linked URL.

In box 606, the debugging application 109 requests the transformed code 106 from the production code server 112 (FIG. 2) at the determined URL via the proxy 103 (FIG. 2). The debugging application 109 may be configured to make the request via the proxy 103, or the request may be transparently intercepted by the proxy 103. In box 609, the debugging application 109 receives the transformed code 106 from the proxy 103, where the transformed code 106 has been modified automatically by the proxy 103 to indicate a source map 115 (FIG. 2).

In box 610, the debugging application 109 verifies a signature of the transformed code 106 using a trusted proxy certificate 236 (FIG. 2). In box 612, the debugging application 109 determines that the transformed code 106 has a source map 115. For example, the transformed code 106 may have been modified to include a URL of the source map 115 or to include the source map 115 itself. In box 615, the debugging application 109 receives the source map 115 from the proxy 103. To this end, the debugging application 109 may use a URL included in the transformed code 106 to request the source map 115 from the proxy 103.

In box 618, the debugging application 109 applies the source map 115 to the transformed code 106 to reverse one or more transformations to the original source code. Such transformations may include, for example, minification, obfuscation, transpilation, and so on. In box 621, the debugging application 109 facilitates debugging of the source code. The debugging application 109 may execute the code and provide stack traces that have been translated using the source map 115 to be human readable and to correspond to the original source code. Thereafter, the operation of the portion of the debugging application 109 ends.

Figure 7:
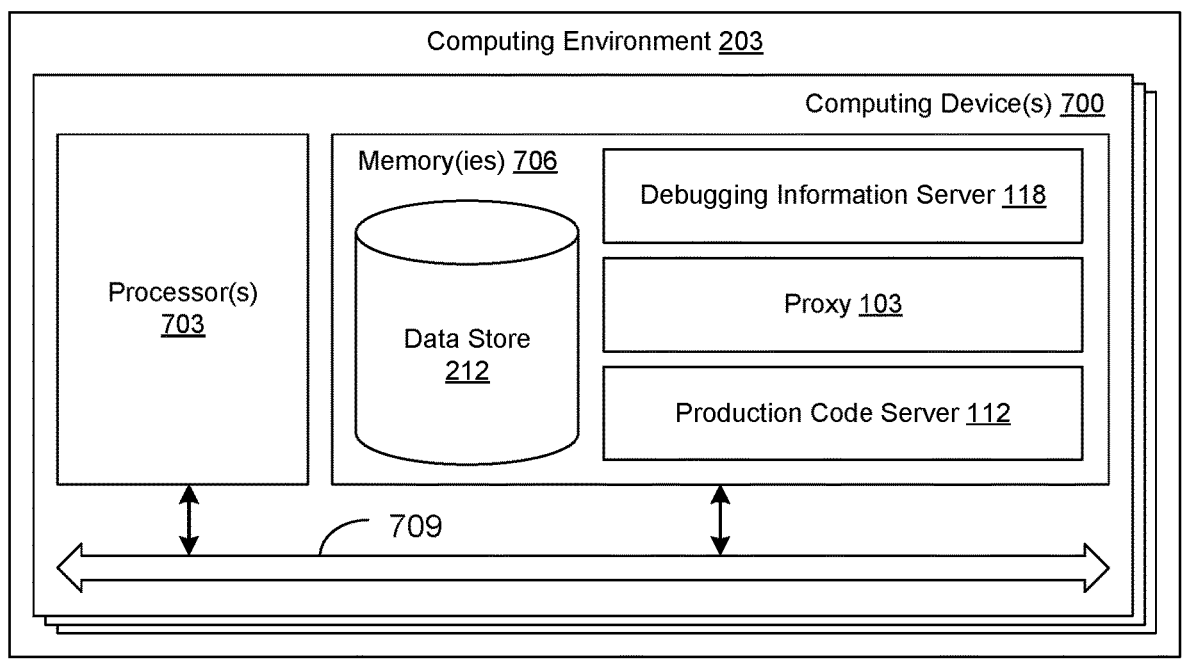
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700.

Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the debugging information server 118, the proxy 103, the production code server 112, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the debugging information server 118, the proxy 103, the production code server 112, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the debugging information server 118, the proxy 103, and the debugging application 109 (FIG. 2). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the debugging information server 118, the proxy 103, the production code server 112, and the debugging application 109, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the debugging information server 118, the proxy 103, the production code server 112, and the debugging application 109, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a proxy executable in at least one computing device, wherein when executed the proxy causes the at least one computing device to at least:
   receive a request from a debugging application executed in a client device to obtain transformed code from a first server;
   obtain the transformed code from the first server;
   determine a version of the transformed code;
   automatically obtain a source map corresponding to the version of the transformed code from a second server;
   automatically modify the transformed code to include the source map or a reference to the source map;
   sign the transformed code using a certificate trusted by the debugging application; and
   return the transformed code and the source map to the debugging application.

2. The non-transitory computer-readable medium of claim 1, wherein the source map includes data that enables the debugging application to perform a reversal of a transformation of the transformed code, and the transformation comprises at least one of: a minification, a transpilation, or an obfuscation.

3. The non-transitory computer-readable medium of claim 1, wherein determining a version of the transformed code further comprises determining a hash value of the transformed code.

4. A system, comprising:
   at least one computing device; and
   a proxy executable in a hardware processor of the at least one computing device, wherein when executed the proxy causes the at least one computing device to at least:
      receive a request from a client application to obtain transformed code from a first server;
      obtain the transformed code from the first server;
      obtain a source map corresponding to the transformed code from a second server;
      modify the transformed code to include a uniform resource locator (URL) of the source map;
      sign the transformed code using a certificate trusted by the client application; and
      return the transformed code and the source map to the client application.

5. The system of claim 4, wherein obtaining the source map further comprises automatically requesting the source map based at least in part on a unique identifier of the transformed code.

6. The system of claim 5, wherein when executed the proxy further causes the at least one computing device to at least determine the unique identifier by applying a hashing function to the transformed code.

7. The system of claim 4, wherein the source map enables a reversal of a transformation used to generate the transformed code.

8. The system of claim 7, wherein the transformation corresponds to a source code minification.

9. The system of claim 7, wherein the transformation corresponds to a source code obfuscation.

10. The system of claim 7, wherein the transformation corresponds to a transpilation of source code from a first programming language version to a second programming language version.

11. The system of claim 7, wherein the transformation corresponds to a removal of a symbol table.

12. The system of claim 4, wherein the proxy is implemented as a transparent proxy that transparently intercepts network traffic from the client application.

13. The system of claim 4, wherein the transformed code is executable by the client application.

14. The system of claim 4, wherein the client application is a debugging application configured to debug the transformed code.

15. The system of claim 4, wherein the proxy receives the request, obtains the transformed code and the source map, and returns the transformed code and the source map via hypertext transfer protocol (HTTP), HTTP secure (HTTPS), or WebSocket.

16. A method, comprising:
   receiving, via at least one of one or more computing devices, a request from a client application to obtain transformed code from a first server;
   obtaining, via at least one of the one or more computing devices, the transformed code from the first server;
   determining, via at least one of the one or more computing devices, a unique identifier of a source map corresponding to the transformed code by applying a hashing function to the transformed code;

automatically requesting, via at least one of the one or more computing devices, the source map from a second server based at least in part on the unique identifier of the transformed code; and returning, via at least one of the one or more computing devices, the transformed code and the source map to the client application.

17. The method of claim 16, further comprising modifying, via at least one of the one or more computing devices, the transformed code to include a reference to the source map.

18. The method of claim 17, wherein the reference comprises a uniform resource locator (URL) of the source map.

19. The method of claim 16, further comprising signing, via at least one of the one or more computing devices, the transformed code using a certificate trusted by the client application.

20. The method of claim 16, wherein the source map includes data that enables the client application to perform a reversal of a transformation of the transformed code, and the transformation comprises at least one of: a minification, a transpilation, or an obfuscation.

\* \* \* \* \*